United States Patent
Miyakoshi

(10) Patent No.: US 11,076,065 B2
(45) Date of Patent: Jul. 27, 2021

(54) IMAGE FORMING APPARATUS INCORPORATING A SENSOR UNIT HAVING GLASSES THAT CONTACTS AND DETECTS EDGE OF A SHEET IN WIDTH DIRECTION

(71) Applicant: KYOCERA Document Solutions Inc., Osaka (JP)

(72) Inventor: Naoto Miyakoshi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/389,567

(22) Filed: Apr. 19, 2019

(65) Prior Publication Data

US 2019/0327376 A1   Oct. 24, 2019

(30) Foreign Application Priority Data

Apr. 23, 2018 (JP) .............................. JP2018-082311

(51) Int. Cl.
  *H04N 1/00* (2006.01)
  *B65H 5/36* (2006.01)
  *G03G 15/00* (2006.01)
  *B41J 11/00* (2006.01)

(52) U.S. Cl.
  CPC ........... *H04N 1/00748* (2013.01); *B65H 5/36* (2013.01); *H04N 1/0061* (2013.01); *H04N 1/0071* (2013.01); *H04N 1/00602* (2013.01); *B41J 11/003* (2013.01); *G03G 15/5029* (2013.01); *G03G 15/607* (2013.01); *H04N 1/00681* (2013.01)

(58) Field of Classification Search
None
See application file for complete search history.

(56) References Cited

U.S. PATENT DOCUMENTS

| | | | |
|---|---|---|---|
| 9,804,548 B2* | 10/2017 | Kato | B65H 39/14 |
| 2003/0115071 A1* | 6/2003 | Reid | H04N 1/00755 358/475 |
| 2004/0183850 A1* | 9/2004 | Takeuchi | B41J 11/06 347/19 |
| 2006/0056860 A1* | 3/2006 | Nojima | G03G 15/6564 399/16 |

(Continued)

FOREIGN PATENT DOCUMENTS

JP   3883907 B2   11/2006

*Primary Examiner* — Haris Sabah
(74) *Attorney, Agent, or Firm* — Stein IP, LLC

(57) ABSTRACT

An edge detection unit is arranged in a conveying portion conveying a sheet and detects the edge of the sheet in the width direction perpendicular to the sheet conveying direction. A light source unit is arranged opposite the sheet. A detecting portion holder holds the edge detection unit and the light source unit. A conveying roller pair positions the sheet conveyed toward the edge detection unit. A unit housing houses the detecting portion holder and the conveying roller pair. The edge detection unit has a contact glass making contact with the sheet. The light source unit has a facing glass facing the contact glass. One glass out of the contact glass and the facing glass is inclined downward at a first angle with respect to the tangent line, which passes through the nip portion between the conveying roller pair, toward the downstream side in the sheet conveying direction.

17 Claims, 11 Drawing Sheets

(56) References Cited

U.S. PATENT DOCUMENTS

| | | | | |
|---|---|---|---|---|
| 2008/0112019 A1* | 5/2008 | Kawaguchi | ........ | H04N 1/00875 |
| | | | | 358/474 |
| 2009/0166953 A1* | 7/2009 | Osakabe | .................. | B65H 7/02 |
| | | | | 271/18 |
| 2013/0321884 A1* | 12/2013 | Miura | .................. | H04N 1/0057 |
| | | | | 358/498 |
| 2015/0350475 A1* | 12/2015 | Uchiyama | .......... | H04N 1/00713 |
| | | | | 358/474 |
| 2017/0134598 A1* | 5/2017 | Nagano | .............. | H04N 1/00559 |
| 2017/0155796 A1* | 6/2017 | Watanabe | .......... | H04N 1/00748 |

\* cited by examiner

IMAGE FORMING APPARATUS INCORPORATING A SENSOR UNIT HAVING GLASSES THAT CONTACTS AND DETECTS EDGE OF A SHEET IN WIDTH DIRECTION

INCORPORATION BY REFERENCE

This application is based upon and claims the benefit of priority from the corresponding Japanese Patent Application No. 2018-082311 filed on Apr. 23, 2018, the entire contents of which are incorporated herein by reference.

BACKGROUND

The present disclosure relates to a sensor unit incorporating a sensor that detects an edge of a recording medium in the form of a sheet, and to an image forming apparatus incorporating such a sensor unit.

A conventional image reading device is provided with a document glass arranged in a conveying path for a document, a first reading means for reading one face of the document conveyed across the document glass, a second reading means for reading the other face of the document, and an auxiliary guiding member for conveying the document fed from obliquely above the document glass to a position where it is read by the first reading means and the second reading means. The auxiliary guiding member is arranged apart from the document glass and is rotatable around a downstream-side end part of the document in the sheet conveying direction. When the document is out of contact with it, the auxiliary guiding member is arranged opposite the document glass across a predetermined distance; when the document makes contact with it, the auxiliary guiding member rotates in a direction away from the document glass and presses the document toward the document glass.

With the document reading device configured as described above, the document is pressed against the document glass by the auxiliary guiding member, and this permits the document to be read reliably; in addition, the force with which the auxiliary guiding member presses the document is controlled, and this helps reduce the friction between the document and the document reading device, thereby preventing formation of paper particles.

However, with the image reading device described above, it is difficult to prevent foreign matter, such as dirt, dust, and paper particles, from remaining attached to the document glass, and to prevent the reading accuracy from lowering as a result of foreign matter attaching to and (or) accumulating on the document glass. The image reading device needs to be provided with a rotating auxiliary guiding member; this leads to a complicated structure and makes size reduction difficult.

SUMMARY

A sensor unit according to one aspect of the present disclosure includes an edge detection unit, a light source unit, a detecting portion holder, a conveying roller pair, and a unit housing. The edge detection unit is arranged in a conveying portion conveying a sheet and detects the edge of the sheet in the width direction perpendicular to the sheet conveying direction. The light source unit is arranged opposite the sheet. The detecting portion holder holds the edge detection unit and the light source unit. The conveying roller pair positions the sheet conveyed toward the edge detection unit. The unit housing houses the detecting portion holder and the conveying roller pair. The edge detection unit includes a contact glass making contact with the sheet. The light source unit includes a facing glass that faces the contact glass. One glass out of the contact glass and the facing glass is inclined downward at a first angle with respect to the tangent line, which passes through the nip portion between the conveying roller pair, toward the downstream side in the sheet conveying direction.

Further features and advantages of the present disclosure will become apparent from the description of embodiments given below.

DETAILED DESCRIPTION

Figure 1:
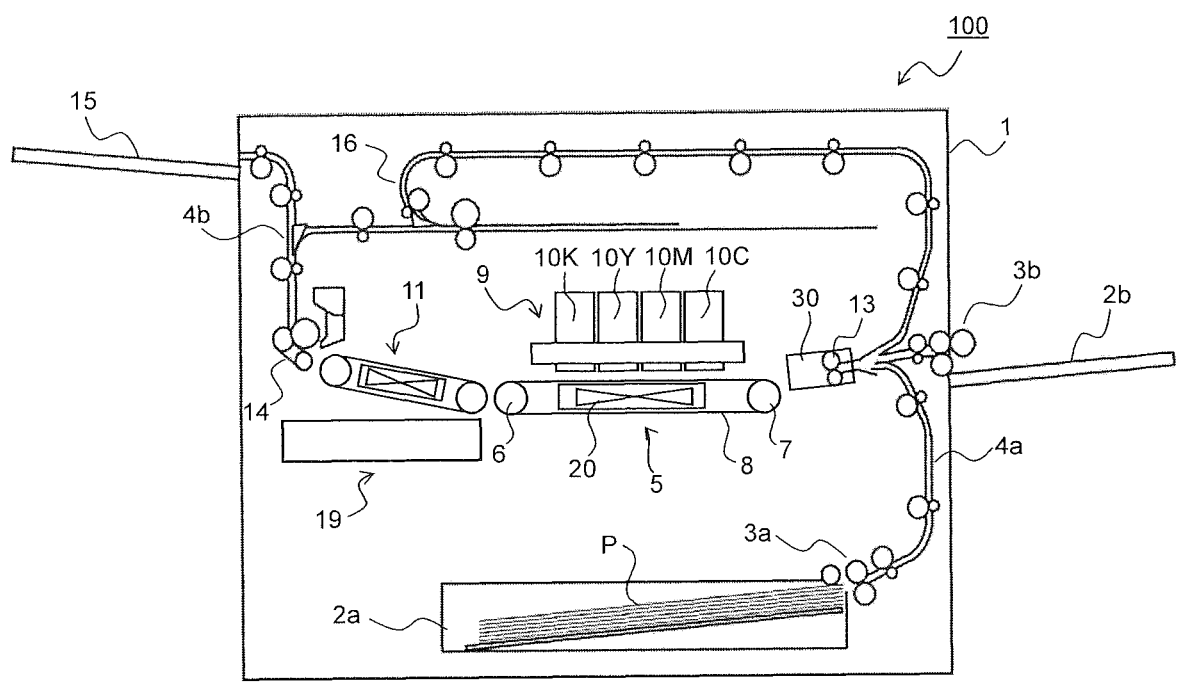
FIG. 1 is a side sectional view showing an outline of a structure of an inkjet recording-type printer incorporating a sensor unit according to one embodiment of the present disclosure.

Hereinafter, with reference to the accompanying drawings, embodiments will be described. FIG. 1 is a side sectional view showing an outline of a structure of an inkjet recording-type printer 100 incorporating a sensor unit 30 according to one embodiment of the present disclosure.

As shown in FIG. 1, in the printer 100, in a lower part inside a printer main body 1, a sheet feed cassette 2*a*, which serves as a sheet storage portion, is arranged, and outside the right side face of the printer main body 1, a manual sheet feed tray 2*b* is arranged. Over the downstream side of the sheet feed cassette 2*a* in the sheet conveying direction (the right side of the sheet feed cassette 2*a* in FIG. 1), a sheet feed device 3*a* is arranged. On the downstream side of the manual sheet feed tray 2*b* in the sheet conveying direction (the left side of the manual sheet feed tray 2*b* in FIG. 1), a sheet feed device 3b is arranged. The sheet feed devices 3a and 3b separate and feed out sheets P one by one.

In the printer 100, a first sheet conveying passage 4a is provided. The first sheet conveying passage 4a is located to the upper right of the sheet feed cassette 2a and is located to the left of the manual sheet feed tray 2b. A sheet P fed out from the sheet feed cassette 2a is conveyed vertically upward along a side face of the printer main body 1 through the first sheet conveying passage 4a. And a sheet fed out from the manual sheet feed tray 2b is conveyed approximately horizontally leftward through the first sheet conveying passage 4a.

At the downstream end of the first sheet conveying passage 4a with respect to the sheet conveying direction, a sensor unit 30 is arranged which detects the position (edge position) of an end part of the sheet P in the width direction (the direction perpendicular to the sheet conveying direction). Near the sensor unit 30 on its downstream side, a first belt conveying portion 5 and a recording portion 9 are arranged.

The sensor unit 30 is provided with a registration roller pair (a conveying roller pair) 13. The registration roller pair 13 on one hand corrects skewed feeding of the sheet P, and on the other hand feeds out the sheet P toward the first belt conveying portion 5 with timing coordinated with the ink ejection operation performed by the recording portion 9. The structure of the sensor unit 30 will be described in detail later.

The first belt conveying portion 5 includes a first conveying belt 8, which is an endless belt and is wound around a first driving roller 6 and a first driven roller 7. The first conveying belt 8 is provided with a plurality of perforations (unillustrated) for air suction. A sheet P fed out from the registration roller pair 13 passes under the recording portion 9 in a state held by suction on the first conveying belt 8 by a sheet suction portion 20 provided inside the first conveying belt 8.

The recording portion 9 includes line heads 10C, 10M, 10Y, and 10K. The line heads 10C to 10K record an image on a sheet P conveyed in a state held by suction on a conveying surface of the first conveying belt 8. The line heads 10C to 10K are fed with ink of four colors (cyan, magenta, yellow, and black), respectively, stored in corresponding ink tanks (unillustrated).

The line heads 10C to 10K eject their respective ink toward a sheet P sucked on the first conveying belt 8, and thereby on the sheet P, a full-color image is recorded that has ink of four colors, namely cyan, magenta, yellow, and black, overlaid together. The printer 100 can record a monochrome image as well.

On the downstream side (in FIG. 1, the left side) of the first belt conveying portion 5 in the sheet conveying direction, a second belt conveying portion 11 is arranged. A sheet P having an image recorded to it in the recording portion 9 is fed to the second belt conveying portion 11, and while it passes through the second belt conveying portion 11, the ink ejected onto the surface of the sheet P is dried. The second belt conveying portion 11 has a similar structure as the first belt conveying portion 5, and therefore no overlapping description will be repeated.

On the downstream side of the second belt conveying portion 11 in the sheet conveying direction, near the left side face of the printer main body 1, a decurler portion 14 is arranged. A sheet P having ink dried in the second belt conveying portion 11 is conveyed to the decurler portion 14, and a curl in the sheet P is corrected.

On the downstream side of (in FIG. 1, above) the decurler portion 14 in the sheet conveying direction, a second sheet conveying passage 4b is arranged. When no duplex recording is performed, a sheet P having passed through the decurler portion 14 is discharged from the second sheet conveying passage 4b via a discharge roller pair onto a sheet discharge tray 15 provided outside the left side face of the printer 100. When duplex recording is performed on a sheet P, the sheet P having undergone recording on one side and having passed through the second belt conveying portion 11 and then through the decurler portion 14 passes through the second sheet conveying passage 4b to be conveyed to a reverse conveying passage 16. The sheet P conveyed to the reverse conveying passage 16 has its sheet conveying direction switched to be reversed top side down, and passes over the printer 100 to be conveyed to the registration roller pair 13. Then, the sheet P is conveyed, with unrecorded side up, once again to the first belt conveying portion 5.

Under the second belt conveying portion 11, a maintenance unit 19 is arranged. When the maintenance of recording heads in the line heads 10C to 10K is performed, the maintenance unit 19 wipes off the ink ejected (purged out) from ink ejection nozzles of the reading heads and collects the ink wiped off.

When ink is collected, the first belt conveying portion 5 located under the recording portion 9 is moved down. Here, together, the first driving roller 6, the first driven roller 7, the first conveying belt 8, and the sheet suction portion 20 are moved down. The maintenance unit 19 moves horizontally so as to be arranged between the recording portion 9 and the first belt conveying portion 5. Then, a wiping member such as a wiper (unillustrated) provided in the maintenance unit 19 is put into contact with the recording heads to wipe off and collect ink. The movement of the first belt conveying portion 5 and the maintenance unit 19 is achieved by a well-known mechanism. Thus, in this respect, no detailed description will be given.

Figure 2:
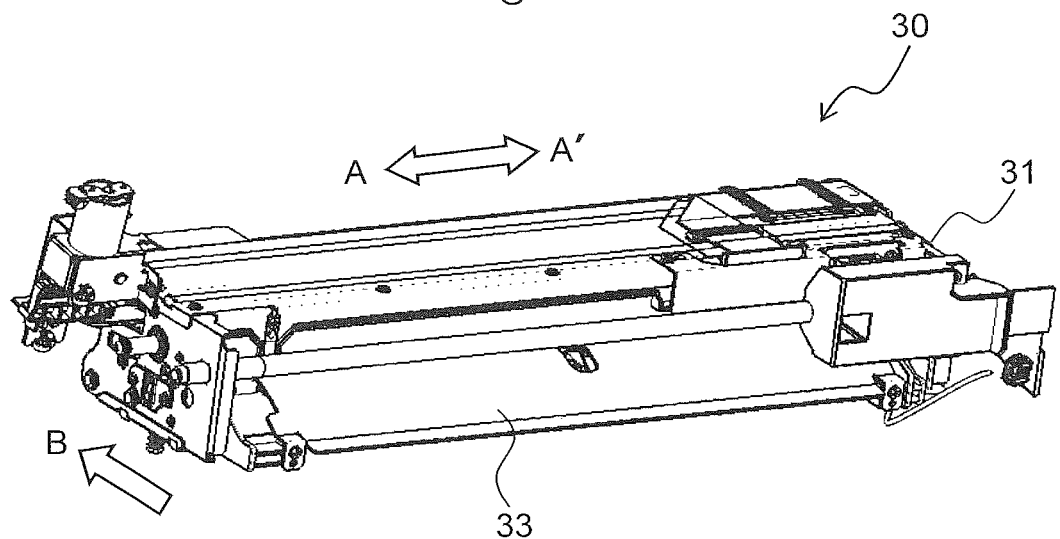
FIG. 2 is an exterior perspective view of the sensor unit incorporated in the printer.
Figure 3:
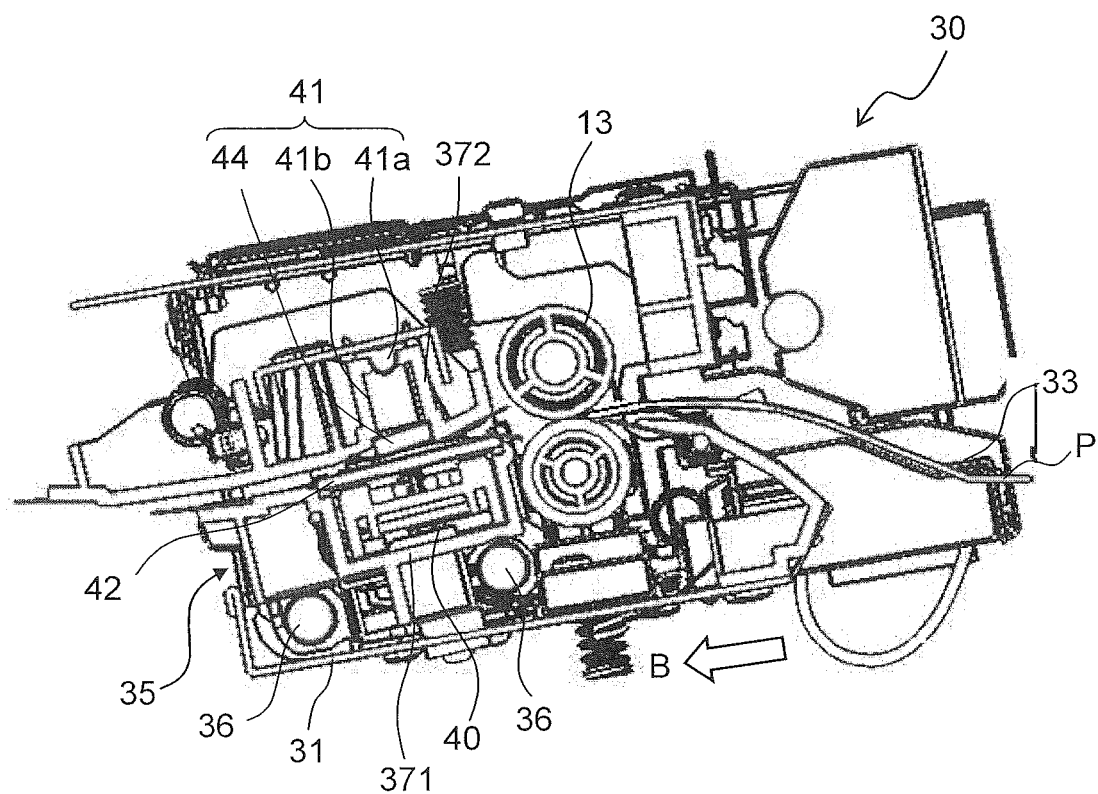
FIG. 3 is a side sectional view of the sensor unit.
Figure 4:
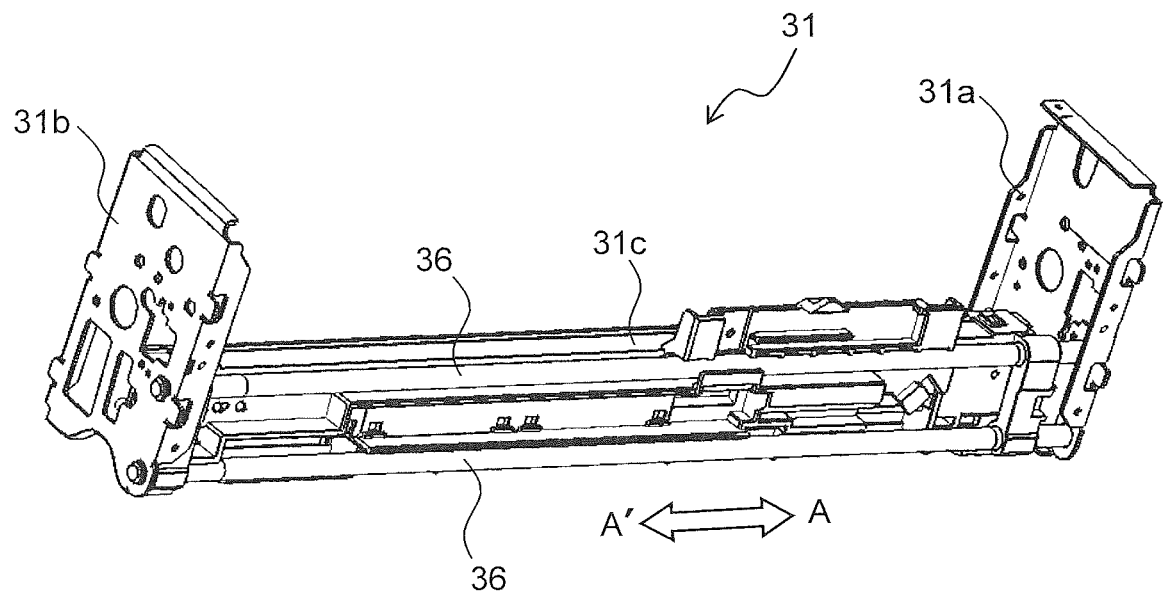
FIG. 4 is a perspective view of a frame constituting a unit housing of the sensor unit.

Next, the structure of the sensor unit 30 will be described in detail. FIG. 2 is an exterior perspective view of the sensor unit 30 incorporated in the printer 100. FIG. 3 is a side sectional view of the sensor unit 30. FIG. 4 is a perspective view of a frame constituting a unit housing 31 of the sensor unit 30.

As shown in FIGS. 2 and 3, the sensor unit 30 includes a unit housing 31, a registration roller pair 13, an edge detection unit 40, a registration entrance guide 33, a light source unit 41, and a detecting portion holder 35. The unit housing 31 rotatably supports the registration roller pair 13, and supports the detecting portion holder 35 so that this is movable in the sheet width direction (the direction indicated by arrows A and A'). In an upstream-side end part of the unit housing 31 in the sheet conveying direction (the direction indicated by arrow B), the registration entrance guide 33 is provided which guides a sheet P to a nip portion between the registration roller pair 13.

The unit housing 31 is formed of an electrically conductive material such as sheet metal. As shown in FIG. 4, the unit housing 31 includes side frames 31a and 31b arranged on the front and rear sides, respectively, of the printer 100 and a coupling frame 31c coupling the side frames 31a and 31b together so as to bridge them. Between the side frames 31a and 31b, two shafts 36 slidably supporting the detecting portion holder 35 are fixed parallel to each other.

The detecting portion holder 35 is arranged next to the downstream-side (in FIG. 3, left-side) of the registration roller pair 13 with respect to the sheet conveying direction (the direction indicated by arrow B) of a sheet P. The detecting portion holder 35 includes a detecting portion receiving space 371 and a light source unit receiving space 372. The detecting portion receiving space 371 is arranged in a lower part of the detecting portion holder 35. The detecting portion receiving space 371 is a box member having an opening in an upper part of it, and inside the detecting portion receiving space 371, an edge detection unit 40 is housed. The light source unit receiving space 372 is arranged in an upper part of the detecting portion holder 35. The light source unit receiving space 372 has an opening in a lower part of it and houses the light source unit 41. That is, the edge detection unit 40 housed in the detecting portion receiving space 371 and the light source unit 41 housed in the light source unit receiving space 372 face each other in the up-down direction (see FIG. 3, and also FIG. 7 etc., which will be referred to later).

Figure 5:
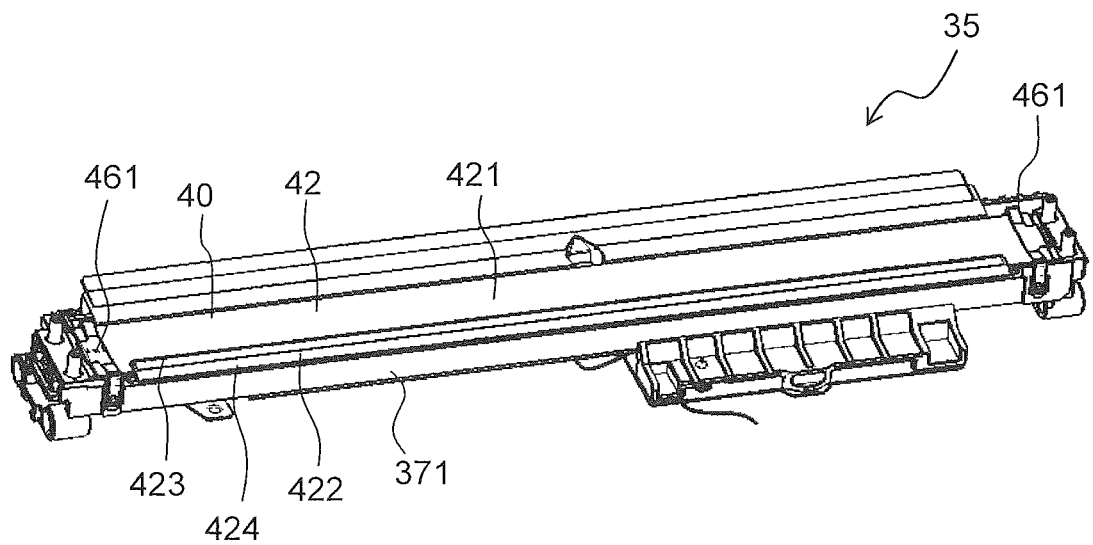
FIG. 5 is an exterior perspective view of a detecting portion space in a detecting portion holder.
Figure 6:
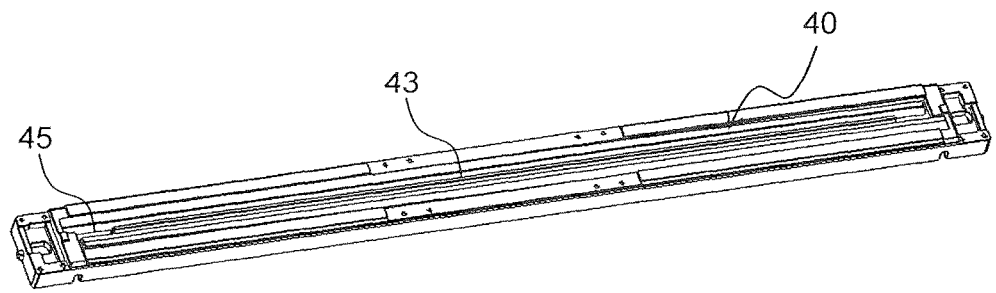
FIG. 6 is a perspective view, as seen from the top face side, of an edge detection unit incorporated in the detecting portion space.
Figure 7:
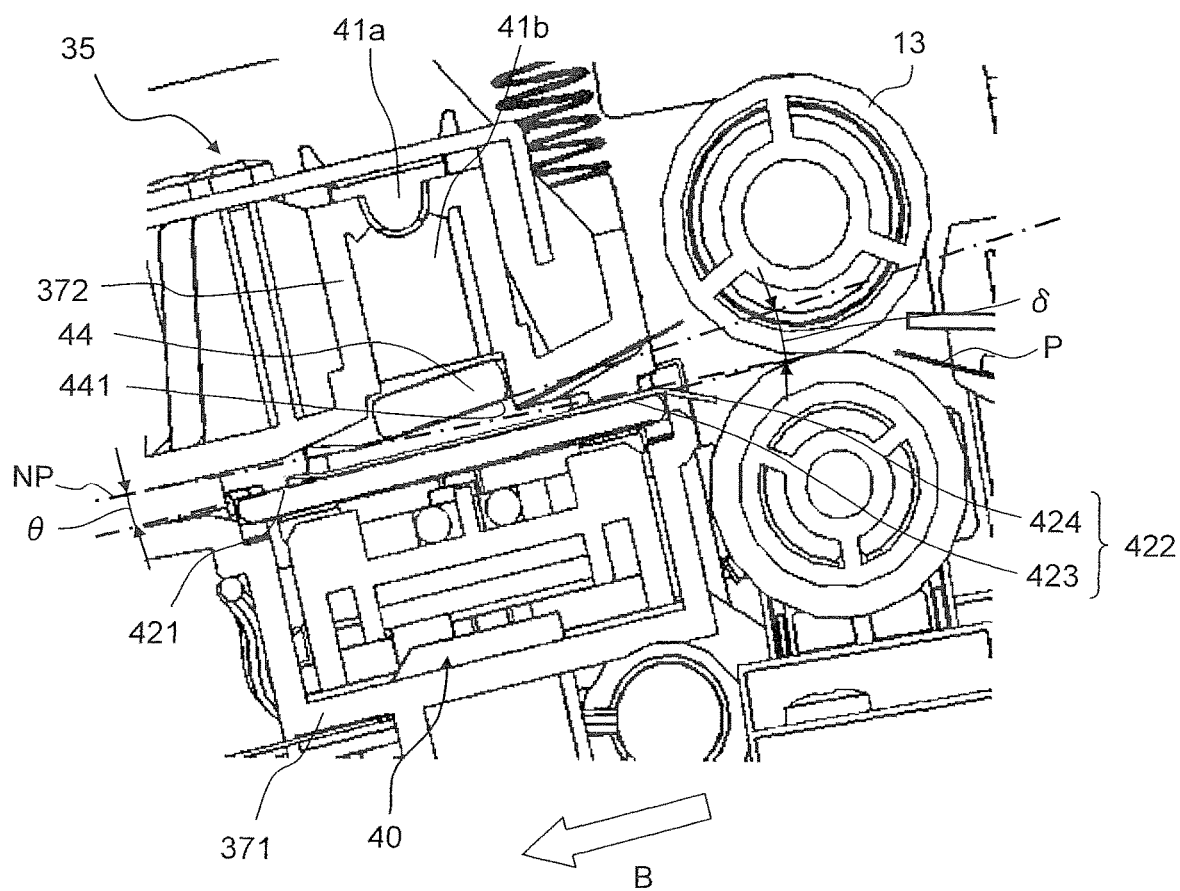
FIG. 7 is an enlarged side sectional view of the detecting portion holder.

The edge detection unit 40 is, for example, a CIS (contact image sensor). The edge detection unit 40 detects the edge part of a sheet P in the width direction based on the difference in intensity of light between a part where the light from the light source unit 41 enters and a part where the light from the light source unit 41 is intercepted by a sheet P. Here, with reference to another few diagrams, the edge detection unit 40 will be described in detail. FIG. 5 is an exterior perspective view of the detecting portion receiving space 371 in the detecting portion holder 35. FIG. 6 is a perspective view, as seen from the top face side, of the edge detection unit 40 incorporated in the detecting portion receiving space 371. FIG. 7 is an enlarged side sectional view of the detecting portion holder 35.

The edge detection unit 40 includes a contact glass 42, a light conversion portion 43, and a circuit board 45. The light conversion portion 43 includes a plurality of photoelectric conversion elements arrayed in the sheet width direction (FIG. 6, the left-right direction). A photoelectric conversion element is an element which converts the incident light into a voltage and then outputs it, and the voltage value resulting from the conversion varies with the intensity of the incident light. Specifically, when the incident light is intense (bright), the output voltage value is high, and when the incident light is feeble (dim), the output voltage value is low. The edge detection unit 40 transmits to a binarizing circuit 75, which will be described later, an output signal including the voltage value output from the light conversion portion 43.

The light conversion portion 43 is mounted on the top face of the circuit board 45. The light conversion portion 43 is mounted on the circuit board 45, and is then housed in the detecting portion receiving space 371. Here, the light conversion portion 43 is arranged such that it can sense light from above, that is, from the open side of the detecting portion receiving space 371.

The contact glass 42 is arranged in an upper part of the edge detection unit 40. Moreover, the contact glass 42 is arranged so as to cover the opening in the upper part of the detecting portion receiving space 371. The bottom face, which is one of the faces, of a sheet conveyed from the registration roller pair 13 makes contact with the top face of the contact glass 42. The top face of the contact glass 42 is a first facing surface 421. Specifically, the first facing surface 421 faces a facing glass 44, which will be described later, of the light source unit 41.

As shown in FIG. 7, the first facing surface 421 of the contact glass 42 is inclined at a first angle θ with respect to the contact plane between the registration roller pair 13, that is, the tangent line NP passing through the nip portion. The first facing surface 421 is a face which is arranged so as to be increasingly far from the tangent line NP passing through the nip portion toward the downstream side in the sheet conveying direction. The first angle θ can be, for example, 2° or more but 10° or less. In the contact glass 42, the angle of the first facing surface 421 can be such that, in the contact glass 42, the first facing surface 421 is inclined with respect to the opposite face. A glass sheet having parallel flat faces can be attached to the detecting portion receiving space 371 with an inclination. Moreover, the detecting portion receiving space 371 itself can be inclined with respect to the unit housing 31.

The contact glass 42 is transmissive to light. Light emitted from the light source unit 41 is transmitted through the contact glass 42, and then reaches the light conversion portion 43. The contact glass 42 functions as a lid which covers at least part of the opening of the detecting portion receiving space 371. Thus, the contact glass 42 transmits light to the light conversion portion 43 and prevents the entry of foreign matter, such as dirt, dust, and paper particles, into the detecting portion receiving space 371. The contact glass 42 also prevents contact of a sheet with the light conversion portion 43. Thus, it is possible to prevent soiling with foreign matter and contact of the light conversion portion 43 with a sheet; it is thereby possible to prevent trouble such as failure and deterioration in performance of the light conversion portion 43.

Figure 8:
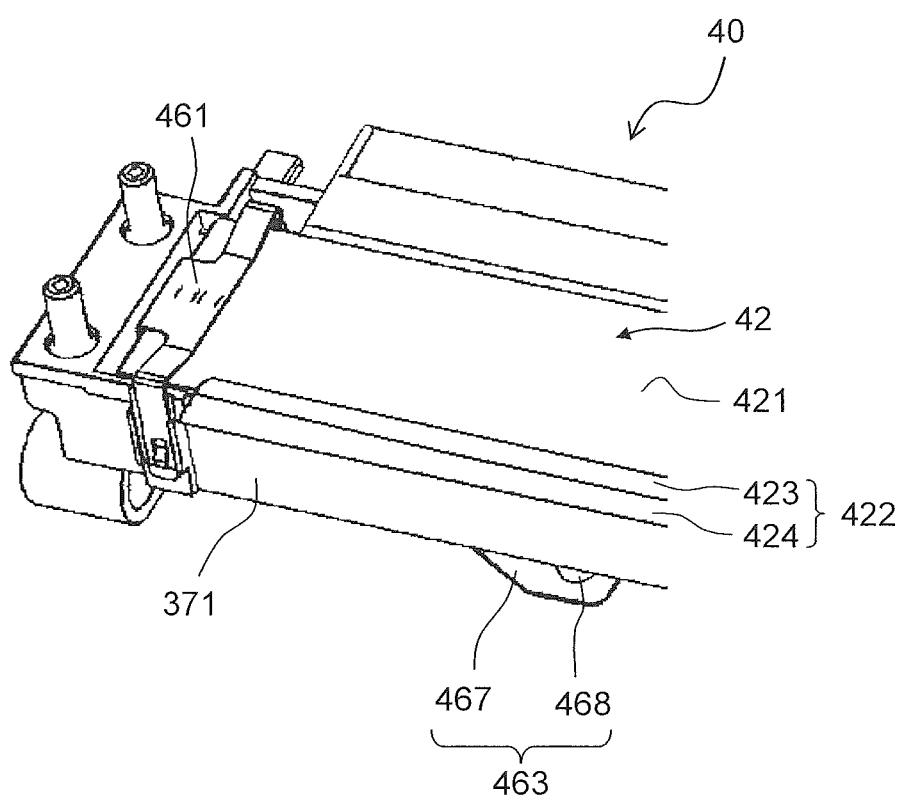
FIG. 8 is a perspective view showing a state where a contact glass is fixed in the detecting portion space with a fixing member.
Figure 9:
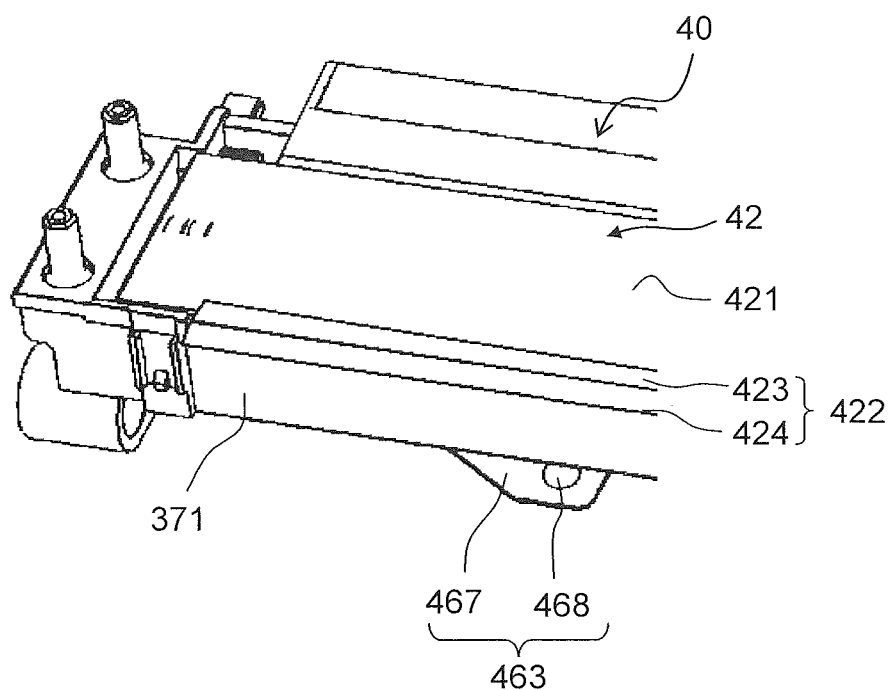
FIG. 9 is a perspective view showing the contact glass and the detecting portion space with the fixing member removed.
Figure 10:
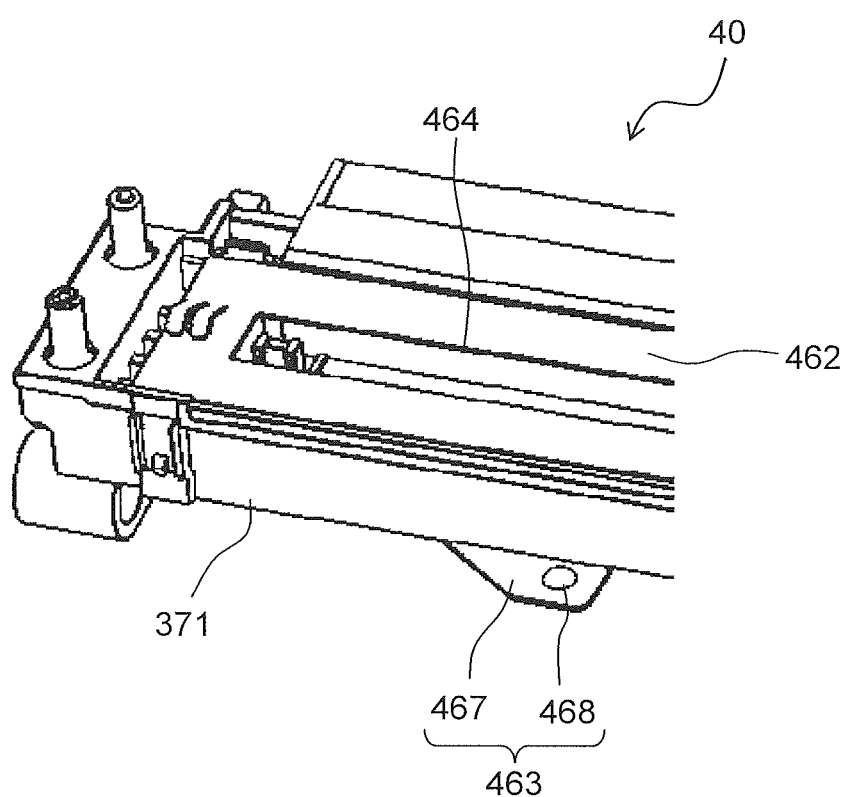
FIG. 10 is a perspective view of the detecting portion space with the contact glass removed.
Figure 11:
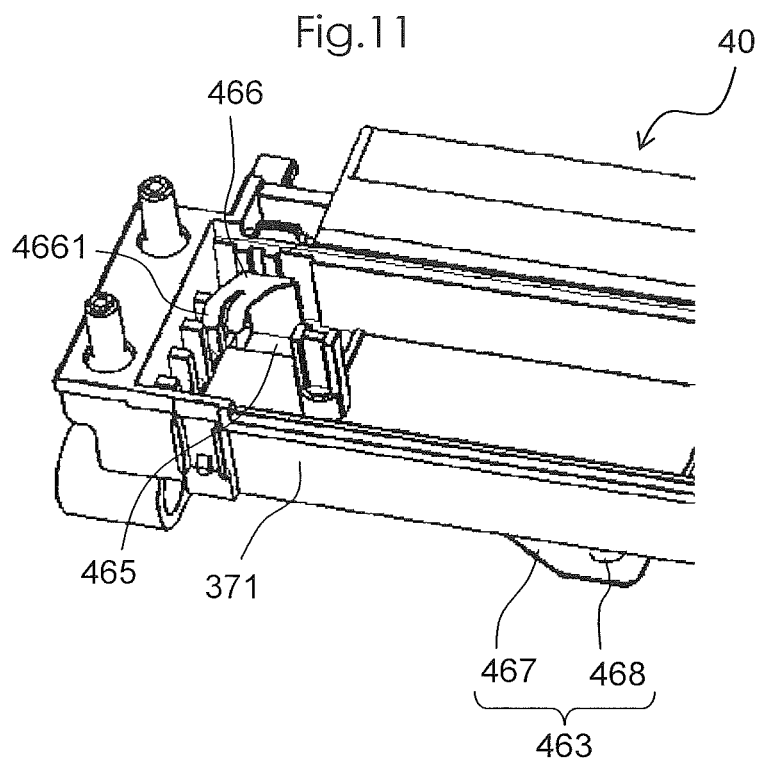
FIG. 11 is a perspective view of the detecting portion space with a conductive member removed.
Figure 12:
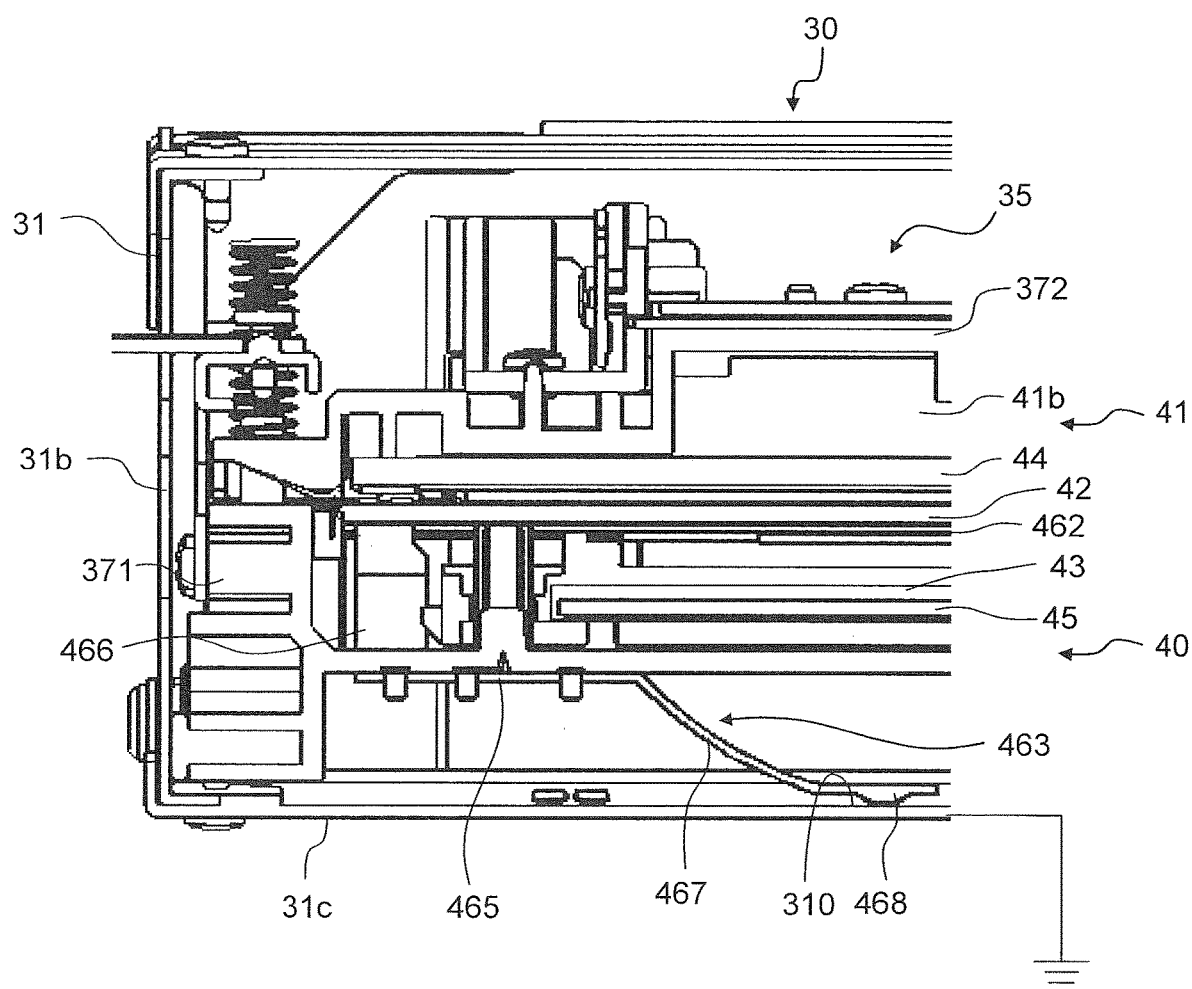
FIG. 12 is a partial sectional view of the sensor unit as cut across a plane extending in the width direction of a sheet.

With reference to another few diagrams, the state of the edge detection unit 40 housed in the detecting portion receiving space 371 will be described in detail. FIG. 8 is a perspective view showing a state where the contact glass 42 is fixed in the detecting portion receiving space 371 with a fixing member 461. FIG. 9 is a perspective view showing the contact glass 42 and the detecting portion receiving space 371 with the fixing member 461 removed. FIG. 10 is a perspective view of the detecting portion receiving space 371 with the contact glass 42 removed. FIG. 11 is a perspective view of the detecting portion receiving space 371 with a conductive member 462 removed. FIG. 12 is a partial sectional view of the sensor unit 30 as cut across a plane extending in the width direction of a sheet P.

The edge detection unit 40 further includes a fixing member 461, a conductive member 462, and an elastic conductive member 463. As shown in FIG. 5, the contact glass 42 has opposite end parts of it in its longitudinal direction fixed in the detecting portion receiving space 371 with the fixing member 461. The fixing member 461 fixes the contact glass 42 in the detecting portion receiving space 371 by making contact with the contact glass 42 and the outer face of the detecting portion receiving space 371. The fixing member 461 can be, for example, an arrangement of which part elastically deforms and that engages with part of the detecting portion receiving space 371 so that the contact glass 42 is fixed in the detecting portion receiving space 371. Here, the fixing member 461 is a sheet metal member formed by bending sheet metal. However, this is not meant as any limitation: it is possible to use any other arrangement which can fix the contact glass 42 firmly in the detecting portion receiving space 371.

As shown in FIGS. 7, 8, and 9, in an upstream-side end part of the first facing surface 421 of the contact glass 42 in the sheet conveying direction, a conveying guide 422 is arranged. The conveying guide 422 is, for example, a member that is thin, with a thickness of about a few millimeters, and that is elongate, extending in the width direction of the sheet P. The conveying guide 422 includes a fitting part 423 and a guiding part 424. The fitting part 423 and the guiding part 424 are integrally formed. The fitting part 423 is a rectangular member which is fixed in the upstream-side end part of the first facing surface 421 in the sheet conveying direction.

The guiding part 424 is a rectangular member extending in the width direction of the sheet P and connects to an upstream-side end part of the fitting part 423 in the sheet conveying direction. The guiding part 424 is arranged on the upstream side of the contact glass in the sheet conveying direction. The guiding part 424 is inclined so as to be increasingly far from the tangent line NP passing through the nip portion in the registration roller pair 13 toward the upstream side in the sheet conveying direction. The guiding part 424 is located on the upstream side of the contact glass 42 in the sheet conveying direction. The fitting part 423 and the guiding part 424 are integrally formed and are bent so as to form an angle larger than 90°. Instead, the fitting part 423 and the guiding part 424 may be formed so as to be continuous via a smoothly curved surface.

The conveying guide 422 is a thin member, and helps reduce the level difference between the downstream end of the fitting part 423 in the sheet conveying direction and the first facing surface 421. Thus, foreign matter, such as dirt, dust, and paper particles are unlikely to accumulate in the level difference part between the downstream end of the fitting part 423 in the sheet conveying direction and the first facing surface 421.

As shown in FIG. 10, the conductive member 462 is arranged in contact with the bottom face of the contact glass 42, that is, the face opposite from the first facing surface 421. The conductive member 462 is formed of a sheet material which can be, for example, an electrically conductive material (such as aluminum and copper), that is, an electrically conductive sheet. The conductive member 462 is provided with an opening window 464. The opening window 464 is arranged right over the light conversion portion 43. Providing the opening window 464 makes it possible to prevent light other than the light emitted from the light source unit 41 from entering the light conversion portion 43. Thus, it is possible to improve the accuracy with which the edge of the sheet is detected by the edge detection unit 40. The conductive member 462 may be formed of a member with high light absorbency, for example, a black member. This helps improve the effect of preventing light other than the light emitted from the light source unit 41 from entering the light conversion portion 43.

As shown in FIGS. 11 and 12, the elastic conductive member 463 is elastically deformable and is electrically conductive. The elastic conductive member 463 has a base part 465, a contact part 466, and a leg part 467. The base part 465, the contact part 466, and the leg part 467 are integrally formed. The base part 465 is a flat-plate-shaped member fixed in the detecting portion receiving space 371.

The contact part 466 protrudes upward from the base part 465 and has a top-end part 4661 bent at a predetermined positon. The bent top-end part 4661 makes contact with the bottom face of the conductive member 462. The whole, or at least a top-end part 4661, of the contact part 466 is elastically deformable and, with its elastic force, the top-end part 4661 presses the conductive member 462 from below toward the contact glass 42. Thus, the contact part 466 makes contact with the conductive member 462. That is, the contact part 466 is electrically connected to the conductive member 462. The contact part 466 is arranged, for example, under the fixing member 461 across the contact glass 42.

With this configuration, the force with which (the top-end part 4661 of) the contact part 466 presses the contact glass 42 acts on the fixing member 461. Thus, even if the elastic force of the contact part 466 is strong, the contact glass 42 can be prevented from floating up, in other words, from curving. It is thus possible to prevent the contact glass 42 from floating up or curving. Specially, as shown in FIG. 10, the conductive member 462 has an extrusion part 4621 formed that is extruded to the top-end part 4661. The extrusion part 4621 makes contact with the contact glass 42, and the conductive member 462 makes contact with the contact glass 42. Thus, the elastic conductive member 463 and the conductive member 462 can be brought into contact with the conductive member 462 and the contact glass 42, respectively. Depending on the material of the conductive member 462, no extrusion part 4621 may be formed. Even in this case, the force of the contact part 466 acts on the conductive member 462, and the conductive member 462 makes contact with the contact glass 42. As will be described in detail later, the elastic conductive member 463 makes contact with a grounded region 310 of the top face of the coupling frame 31c. Thus, the surface of the contact glass 42 is grounded via the conductive member 462 and the elastic conductive member 463.

The leg part 467 protrudes downward from the base part 465. The leg part 467 is inclined with respect to the movement direction of the detecting portion holder 35. A tip-end part of the leg part 467 is bent, and is provided, in a middle part of it, with a protruding part 468 protruding downward. The leg part 467 is elastically deformable. The protruding part 468 is put into pressed contact with the grounded region 310 of the coupling frame 31c of the unit housing 31 by at least the elasticity of the leg part 467. The protruding part 468 has the shape of a truncated sphere and has a small contact area with the grounded region 310 of the coupling frame 31c. The contact part is a smooth curved surface. The protruding part 468 functions as a grounding part. The protruding part 468 may be omitted, in which case the leg part 467 functions as a grounding part.

As mentioned above, the detecting portion holder 35 moves in the sheet width direction relative to the unit housing 31. The elastic conductive member 463 makes contact with the grounded region 310 of the coupling frame 31c via the protruding part 468, and thereby reliably keeps the elastic conductive member 463 in contact with the grounded region 310 of the coupling frame 31c while reducing the friction at the contact part. In the printer 100, the unit housing 31 is grounded. That is, the coupling frame 31c is also grounded, and the elastic conductive member 463 in contact with the grounded region 310 of the coupling frame 31c as well as the conductive member 462 in contact with the elastic conductive member 463 is grounded.

The elastic conductive member 463 can be an arrangement formed by cutting and bending sheet metal, but this is not meant as any limitation: it is possible to use any materials and shapes that can achieve, by elastic deformation, reliable contact with both the conductive member 462 and the unit housing 31 (the grounded region 310 of the coupling frame 31c).

As shown in FIG. 7 etc., the light source unit 41 emits, toward the edge detection unit 40, light having approximately uniform intensity in the width direction of the sheet P. The light source unit 41 is housed inside the light source unit receiving space 372 in the detecting portion holder 35. The light source unit 41 includes an LED 41a and a light guiding member 41b. In the light source unit 41, the LED 41a is arranged in one end part in the sheet width direction. The light guiding member 41b is a rectangular member, and is so arranged that the sheet width direction is its longitudinal direction. One end face in the longitudinal direction is a light entrance face, and light emitted from the LED 41*a* enters the light guiding member 41*b* through the light entrance face. The light having entered the light guiding member 41*b* is diffused inside the light guiding member 41*b*. The bottom face of the light guiding member 41*b* is a light exit face, and the light diffused inside the light guiding member 41*b* emanates from it as light having approximately uniform intensity over the entire range in the sheet width direction.

The light source unit 41 includes a facing glass 44. The facing glass 44 is arranged in a lower part of the light source unit 41, that is, under the light guiding member 41*b*. The facing glass 44 is arranged so as to cover an opening in a lower part of the light source unit receiving space 372. The bottom face of the facing glass 44 is a second facing surface 441 facing the first facing surface 421 of the contact glass 42. The second facing surface 441 may face the sheet P with a gap in between, or may make contact with the sheet P. The facing glass 44 is transmissive to light. The light emitted from the light guiding member 41*b* enters the facing glass 44. The light having entered the facing glass 44 is transmitted through the inside of the facing glass 44, and is shone toward the sheet conveyed from the second facing surface 441 and (or) the first facing surface 421.

A sheet P conveyed by the registration roller pair 13 is conveyed through the gap between the contact glass 42 and the facing glass 44 to the first belt conveying portion 5. That is, the contact glass 42 and the facing glass 44 are arranged opposite each other in the direction perpendicular to both the sheet conveying direction and the width direction of the sheet P and constitute part of a conveying passage through which the sheet P is conveyed. The sheet P conveyed by the registration roller pair 13 is conveyed along the contact glass 42 under the self-weight of the sheet P. That is, the conveying path for the sheet P in the conveying passage formed by the contact glass 42 and the facing glass 44 is a face along the first facing surface 421 of the contact glass 42.

At least the second facing surface 441 of the facing glass 44 is inclined with respect to the conveying path for the sheet P. In other words, the second facing surface 441 is inclined with respect to the first facing surface 421. The angle of the second facing surface 441 with respect to the first facing surface 421 will be referred to as a second angle δ. The second facing surface 441 of the facing glass 44 is inclined so as to be increasingly close to the first facing surface 421 toward the downstream side in the sheet conveying direction. In the light source unit 41, to prevent an upstream end edge of the facing glass 44 from protruding downward beyond the lower end of the light source unit receiving space 372 supporting the former, the tip end of the light source unit receiving space 372 is extended downward beyond the facing glass 44. Here, inclining the upstream side of the facing glass 44 upward makes it possible to shorten the length of the light source unit receiving space 372 in the sheet conveying direction. It is thus possible to reduce the load on the sheet P during conveying. That is, inclining the facing glass 44 makes it possible to achieve smooth conveying of the sheet P.

The facing glass 44 receives light that emerges from the second facing surface 441. The light emerging from the second facing surface 441 is detected in the light conversion portion 43 of the edge detection unit 40. Thus, it is preferable that the light emerging from the second facing surface 441 incidents the first facing surface 421 at an angle at which it is unlikely to be reflected on the first facing surface 421. That is, the second angle δ of the second facing surface 441 with respect to the first facing surface 421 is determined based on the refractive index of the contact glass 42 and the facing glass 44.

In the printer 100 according to this embodiment, by use of the sensor unit 30, the sheet P having been conveyed is stopped temporarily at the registration roller pair 13, and the edge of the sheet P in the edge detection unit 40 is detected, thereby to detect the inclination, displacement, and the like of the sheet P.

Figure 13:
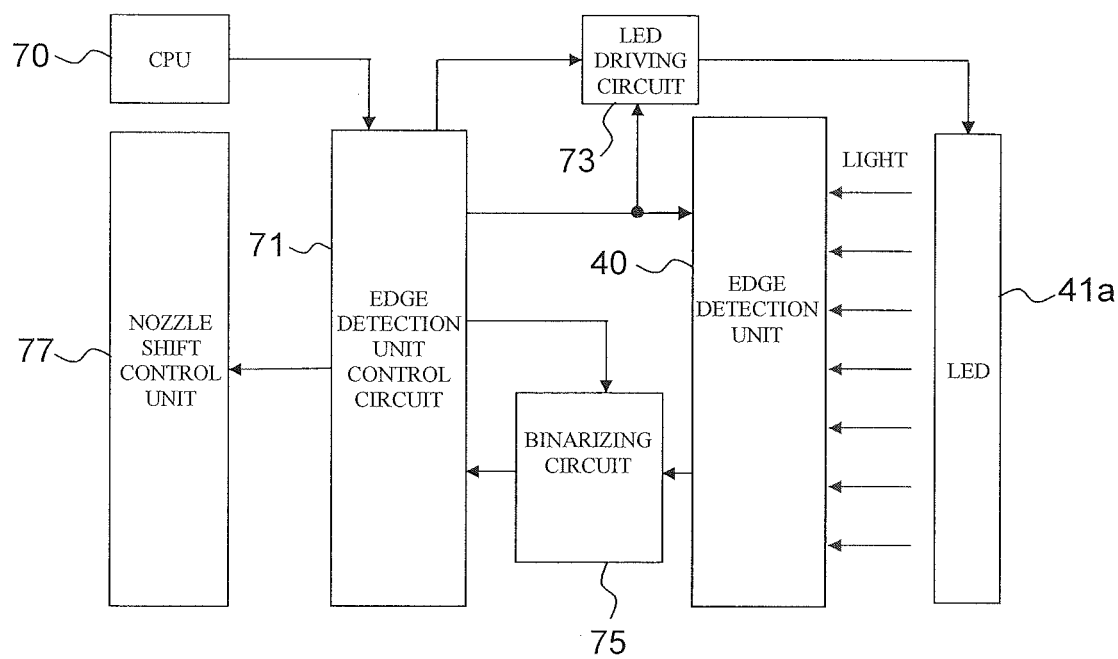
FIG. 13 is a block diagram showing controlling paths in the printer according to the embodiment.

Next, the operation of the printer 100 according to this embodiment will be described. FIG. 13 is a block diagram showing the controlling paths in the printer 100 according to this embodiment. A CPU 70 comprehensively controls the entire printer 100. When operation by the printer 100 for printing on the sheet P is started according to printing data received from an external computer or the like, the CPU 70 makes various settings, in an edge detection unit control circuit 71, for reading a signal from the edge detection unit 40. Based on information on sheet size that is included in the received printing data, the CPU 70 transmits a control signal to a driving motor M, thereby to move the detecting portion holder 35 in the sensor unit 30 by a predetermined amount.

According to the settings made by the CPU 70, the edge detection unit control circuit 71 feeds out to the edge detection unit 40 a reference clock signal for reading a signal from the edge detection unit 40 and an accumulation time determination signal for determining the time for which to accumulate electric charge in the edge detection unit 40. The edge detection unit control circuit 71 also feeds out a PWM signal to an LED driving circuit 73 to set a current value to be supplied the LED 41*a*. The LED driving circuit 73 generates a DC voltage corresponding to the PWM signal from the edge detection unit control circuit 71, and takes that DC voltage as a reference voltage when supplying an electric current to the LED 41*a*. The edge detection unit control circuit 71 also generates a comparison reference voltage (threshold voltage) for binarizing, in the binarizing circuit 75, an analog signal (output signal) from the edge detection unit 40.

With the timing with which the sheet P in a standby state in the registration roller pair 13 (see FIG. 3) is conveyed toward the recording portion 9 (see FIG. 1), the CPU 70 instructs the edge detection unit control circuit 71 to detect the edge position. Thus, instructed by the CPU 70 to detect the edge position, the edge detection unit control circuit 71 feeds out, in synchronism with the accumulation time determination signal, a control signal for turning on the LED 41*a* to the LED driving circuit 73. According to the control signal from the edge detection unit control circuit 71, the LED driving circuit 73 turns on the LED 41*a* for a predetermined period.

The edge detection unit 40 detects the edge of a tip-end part, in the sheet conveying direction, of the sheet P (for example, a part 2 to 3 mm from the end part of the sheet P) conveyed from the registration roller pair 13. The edge detection unit 40 outputs, pixel by pixel as output signals, voltages corresponding to the amounts of light accumulated at the pixels (photoelectric conversion elements) in the group of pixels in the light conversion portion 43 while the LED 41*a* is on in response to the next accumulation time determination signal and reference clock signal. The output signals output from the edge detection unit 40 are binarized in the binarizing circuit 75 being compared with the comparison reference voltage (threshold voltage), and are then, as digital signals, fed to the edge detection unit control circuit 71.

For each output signal output from the edge detection unit 40, the edge detection unit control circuit 71 checks, pixel by pixel sequentially, whether the digital signals binarized in the binarizing circuit 75 have the value 0 or 1. The edge detection unit control circuit 71 detects a position in pixels (a position in photoelectric conversion elements) in the light conversion portion 43 at which the value of the digital signals switches from 0 to 1 or from 1 to 0.

When a position in pixels at which the value of digital signals switches is detected by the edge detection unit control circuit 71, the position of the switch in pixels is determined the edge position of the sheet P in the width direction. The CPU 70 calculates the amount of deviation between the edge position determined by the edge detection unit control circuit 71 and the edge position (reference edge position) as it is when the sheet P is conveyed at an ideal conveying position (reference conveying position) where the sheet P passes through the center position of a passing region. The calculated deviation amount is transmitted to a nozzle shift control unit 77. The nozzle shift control unit 77 shifts the region in which to use the ink ejection nozzles of the line heads 10C to 10K in the recording portion 9 according to the deviation amount of the transmitted sheet P in the width direction.

Figure 14:
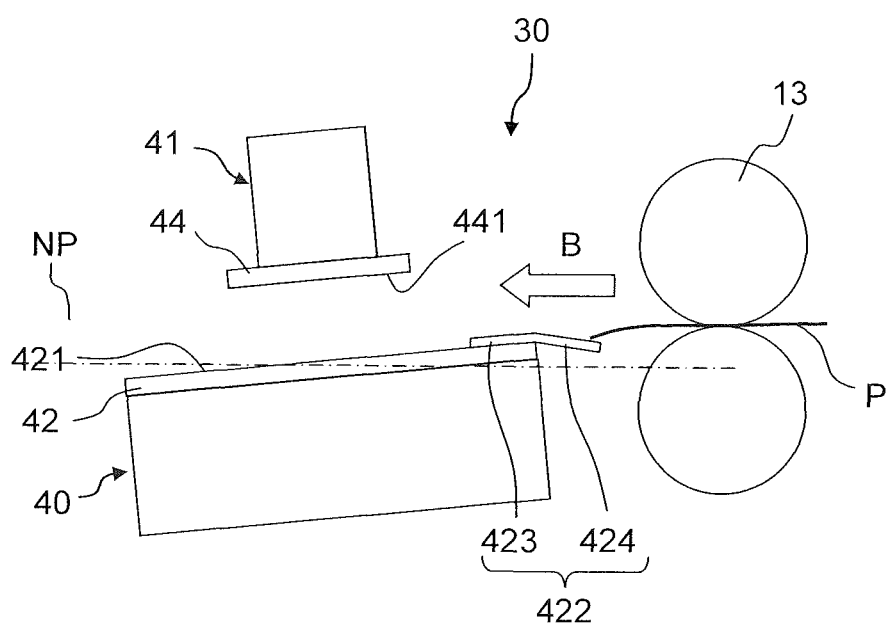
FIG. 14 is a diagram showing an outline of an arrangement of the sensor unit immediately after the conveying of the sheet is restarted by a registration roller pair.
Figure 15:
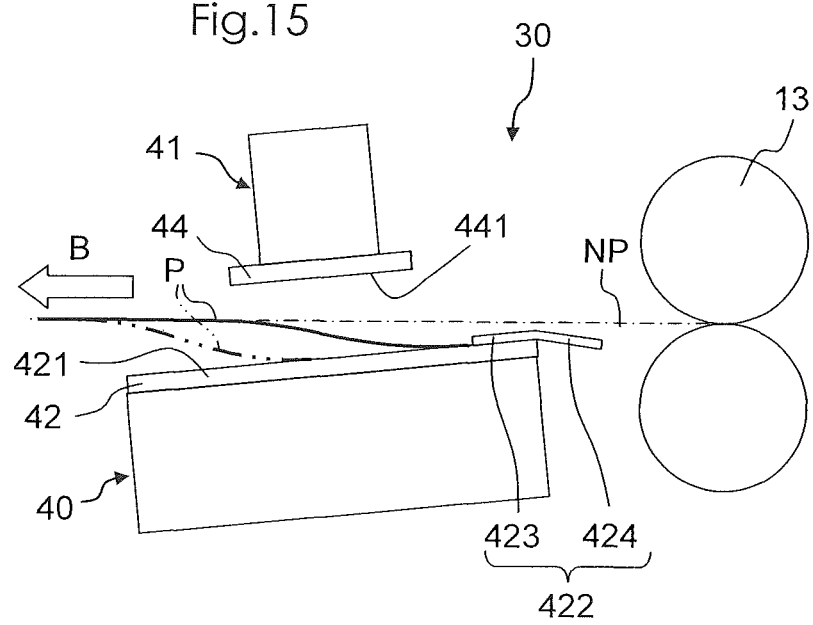
FIG. 15 is a diagram showing the rear end part, in the sheet conveying direction, of the sheet having been conveyed through the sensor unit.

Next, with reference to the relevant drawings, how the sheet P is conveyed in the sensor unit 30 will be described. FIG. 14 is a diagram showing an outline of an arrangement of the sensor unit 30 immediately after the conveying of the sheet P is restarted by the registration roller pair 13. FIG. 15 is a diagram showing the rear end part, in the sheet conveying direction, of the sheet P having been conveyed through the sensor unit 30. In FIG. 15, to show the movement of the sheet P, the sheet P after the movement is indicated by a dash-dot-dot line.

In the sensor unit 30, the sheet P is conveyed into a conveying passage between the edge detection unit 40 and the light source unit 41 by the operation of the registration roller pair 13. As shown in FIGS. 3, 7, 14, 15, etc., the edge detection unit 40 and the light source unit 41 are arranged away from the registration roller pair 13 in the sheet conveying direction. Thus, depending on the thickness and material of the sheet P, the tip-end part, in the sheet conveying direction, of the sheet P conveyed out from the registration roller pair 13 sags under gravity (see FIG. 14).

In an upstream-side end part of the contact glass 42 of the edge detection unit 40 in the sheet conveying direction, the conveying guide 422 is attached, and the guiding part 424 of the conveying guide 422 is located on the upstream side of the contact glass 42 in the sheet conveying direction. Thus, when the front end, in the sheet conveying direction, of the sheet P conveyed from the registration roller pair 13 sags, it makes contact with the guiding part 424. As a result, the sheet P moves along the guiding part 424. Then, the tip end of the sheet P moves to the fitting part 423 along the guiding part 424 of the conveying guide 422, and is guided through the conveying passage between the contact glass 42 and the facing glass 44.

The sheet P slides on a connecting part between the fitting part 423 and the guiding part 424 when moving from the guiding part 424 to the fitting part 423. The guiding part 424 connects, at an angle larger than 90°, with the fitting part 423 fixed on the first facing surface 421 of the contact glass 42. This reduces the friction that the sheet P, when moving from the guiding part 424 to the fitting part 423, experiences against the connecting part between the fitting part 423 and the guiding part 424, resulting in smooth conveying the sheet P. Owing to the reduced friction between the sheet P and the connecting part between the fitting part 423 and the guiding part 424, the sheet P is unlikely to be shaved off, and is thus unlikely to produce paper particles.

The sheet P makes contact with the contact glass 42. Since the conveying guide 422 is thin, the level difference between the top face of the fitting part 423 and the first facing surface 421 of the contact glass 42 is small. Owing to the small level difference between the downstream-side end part of the fitting part 423 in the sheet conveying direction and the first facing surface 421, foreign matter, such as dirt, dust, and paper particles, is unlikely to accumulate at the level difference part: in other words, the amount of foreign matter, such as dirt, dust, and paper particles, accumulated at the level difference part is reduced. It is thus possible to reduce the amount of foreign matter that attaches to the first facing surface 421 of the contact glass 42.

When the sheet P is conveyed by a given amount by the registration roller pair 13, the front end of the sheet P in the sheet width direction reaches the first belt conveying portion 5, and the sheet P is then conveyed by the first belt conveying portion 5. The rear-end part of the sheet P in the sheet conveying direction moves while making contact with the guiding part 424, then with the fitting part 423, and then with the first facing surface 421 of the contact glass 42 in this order. Like the front-end part of the sheet P, also the rear-end part of it in the sheet conveying direction sags under its self-weight (see FIG. 15).

The first facing surface 421 is inclined so as to be increasingly far from the tangent line NP passing through the nip portion in the registration roller pair 13 toward the downstream side in the sheet conveying direction. Thus, a rear-side part of the sheet P in the sheet conveying direction sagging under its self-weight moves on the fitting part 423 and the first facing surface 421 while making contact with the first facing surface 421 at an angle. Thus, foreign matter, such as dirt, dust, and paper particles attached to the first facing surface 421 are removed effectively by the rear-side part of the sheet P in the sheet conveying direction.

That is, the first facing surface 421 is inclined as described above, and the level difference between the fitting part 423 of the conveying guide 422 and the rear-end part of the first facing surface 421 in the sheet conveying direction is small; thus, during conveying, the rear-end part of the sheet P in the sheet conveying direction can make contact with the border between the rear end part of the fitting part 423 in the sheet conveying direction and the first facing surface 421. This makes it possible to effectively remove the foreign matter, such as dirt, dust, and paper particles, accumulated at the level difference part between the downstream-side end part of the fitting part 423 in the sheet conveying direction and the first facing surface 421.

As described above, the first facing surface 421 is inclined so as to be increasingly far from the tangent line NP passing through the nip portion in the registration roller pair 13 toward the downstream side in the sheet conveying direction, and the conveying guide 422 is made thin; this makes it possible to keep the first facing surface 421 clean. It is thus possible to detect the skew, displacement, and the like of the sheet P accurately with the sensor unit 30, that is, the edge detection unit 40.

The surface of the contact glass 42 may be electrostatically charged under the influence of surrounding devices, by friction with the conveyed sheet, and the like. When the surface of the contact glass 42 is electrostatically charged, foreign matter, such as dirt, dust, and paper particles, around the sensor unit 30 is attracted to the contact glass 42 and attaches to the first facing surface 421. Foreign matter attached to the first facing surface 421 makes it difficult for light from the light source unit 41 to enter the light conversion portion 43, possibly degrading the detecting accuracy of the edge detection unit 40. The electrostatically charged surface of the contact glass 42 may cause electric discharge. Electric discharge may cause malfunction and failure of the electronic components mounted on the circuit board 45 including the light conversion portion 43.

In the edge detection unit 40, as described above, the contact glass 42 is electrically connected to the coupling frame 31c of the unit housing 31 via the conductive member 462 and the elastic conductive member 463. As shown in FIG. 12, the unit housing 31 is grounded, and the coupling frame 31c is also grounded. A part of the coupling frame 31c that makes contact with the protruding part 468 is a grounded region 310. That is, the elastic conductive member 463, which makes contact with the coupling frame 31c at the protruding part 468, is grounded. Also the conductive member 462, which makes contact with the contact part 466 of the elastic conductive member 463, is grounded.

The electric charge (electrostatic charge) generated on the surface of the contact glass 42 is discharged to the grounded coupling frame 31c via the conductive member 462 and the elastic conductive member 463. This makes it difficult for dirt, dust, and paper particles to attach to the contact glass 42 by electrostatic charge, and it is thus possible to improve the accuracy with which the edge of the sheet is detected by the edge detection unit 40. The contact glass 42 is unlikely to be electrostatically charged, and it is thus possible to prevent inconveniences such as malfunction and failure of the light conversion portion 43 and other electronic components mounted on the circuit board 45.

The detecting portion holder 35 moves, with respect to the unit housing 31, in the direction perpendicular to the sheet conveying direction, that is, the conveyed sheet width direction. The leg part 467 makes contact with the grounded region 310 of the top face of the coupling frame 31c. Providing the protruding part 468 permits the elastic conductive member 463 to be grounded while reducing the friction at the contact part.

Applying the elastic force of the elastic conductive member 463 to the fixing member 461 makes it possible to prevent the contact glass 42 from floating up, or from curving; it is thus possible to prevent narrowing of the conveying passage formed by the contact glass 42 and the facing glass 44. Thus, it is possible to achieve smooth conveying of the sheet P.

The present disclosure may be implemented in any other manner than in the embodiment described above, and allows for many modifications without departure from the spirit of the present disclosure. For example, the embodiment described above deals with an example where, as the edge detection unit 40, a transmissive CIS including the light conversion portion 43 that receives light of the LED from the light source unit 41 is used; instead, for example, a light emitting portion that emits light to the sheet P may be provided, and by use of a reflective CIS that senses reflected light from the sheet P in the light conversion portion 43, the edge position of the sheet P may be determined based on the intensity difference between reflected light from the sheet P and reflected light from a region where the sheet P does not pass. In that case, it is preferable that a background member having a color different from the color (white) of the sheet P be arranged in a position opposite the light conversion portion 43 of the edge detection unit 40 so as to boost the intensity difference between reflected light from the sheet P and reflected light from a region where the sheet P does not pass.

The embodiment described above deal with an example where a CIS is used as the edge detection unit 40 detecting the edge position of the sheet P; instead, a sensor other than a CIS, such as a CCD, may be used.

Although the embodiment described above deal with, as an example, an inkjet recording-type printer 100 that records an image by ejecting ink from the ink ejection nozzles of line heads 10C to 10K onto a sheet P, the present disclosure is not limited to inkjet recording-type printers 100; it applies as well to, for example, image forming apparatuses that utilize electrophotography, that is, those that form an electrostatic latent image by irradiating an image carrying member such as a photosensitive drum with a laser beam, then form a toner image by attaching toner to the electrostatic latent image, then transfer the toner image to a sheet (recording medium), and then form a permanent image by heating and pressing the transferred unfixed toner image.

What is claimed is:

1. A sensor unit comprising:
   an edge detection unit that is arranged in a conveying portion conveying a sheet, the edge detection unit that detects an edge of the sheet in a width direction perpendicular to a sheet conveying direction;
   a light source unit that is arranged opposite the edge detection unit thereabove, the light source unit emitting light toward the edge detection unit;
   a detecting portion holder that holds the edge detection unit and the light source unit;
   a conveying roller pair that conveys the sheet toward the edge detection unit; and
   a unit housing that houses the detecting portion holder and the conveying roller pair,
   wherein
   the edge detection unit includes a contact glass that makes contact with the sheet,
   the light source unit includes a facing glass that faces the contact glass,
   the contact glass and the facing glass are arranged with a gap therebetween for passage of the sheet and constitute part of the conveying portion,
   light emitted from the light source unit is transmitted through the facing glass to be irradiated toward the contact glass,
   one glass out of the contact glass and the facing glass is inclined downward at a first angle in such a direction as to be increasingly far from a tangent line, which passes through a nip portion between the conveying roller pair, toward a downstream side in the sheet conveying direction, and
   the edge detection unit detects the light emitted from the light source unit and, based on the detected light detects an edge of the sheet passing through the gap.

2. The sensor unit according to claim 1, wherein
   the one glass is the contact glass that has a first facing surface facing one surface of the sheet,
   the edge detection unit further includes a conveying guide that is arranged in an upstream-side end part of the contact glass in the sheet conveying direction, and
   the conveying guide includes
   a fitting part that is mounted along the first facing surface of the contact glass, and a guiding part inclined downward in a direction as to be away from an upstream-side end part of the fitting part toward an upstream side in the sheet conveying direction.

3. An image forming apparatus comprising:
the conveying portion that conveys the sheet;
the sensor unit according to claim 2 that is arranged in the conveying portion; and
a printing portion that prints an image on the sheet conveyed in the conveying portion.

4. The sensor unit according to claim 2, wherein
the facing glass is inclined at a second angle with respect to the contact glass so as to be increasingly far from the contact glass toward the upstream side in the sheet conveying direction.

5. An image forming apparatus comprising:
the conveying portion that conveys the sheet;
the sensor unit according to claim 4 that is arranged in the conveying portion; and
a printing portion that prints an image on the sheet conveyed in the conveying portion.

6. The sensor unit according to claim 1, further comprising:
a conductive member that makes contact with a surface of the contact glass opposite from the first facing surface, wherein
the contact glass is grounded via the conductive member.

7. The sensor unit according to claim 6, further comprising:
an elastic conductive member that connects the conductive member and a grounded region of the unit housing electrically and that is deformable elastically, wherein
the elastic conductive member includes
a contact part that makes contact with the conductive member, and
a grounding part that makes contact with the grounded region.

8. The sensor unit according to claim 7, further comprising:
a fixing member that is arranged at each ends of the contact glass in a sheet width direction and fixes the contact glass to the unit housing, wherein
the contact part is arranged at a position opposite the fixing member across the contact glass.

9. An image forming apparatus comprising:
the conveying portion that conveys the sheet;
the sensor unit according to claim 8 that is arranged in the conveying portion; and
printing portion that prints an image on the sheet conveyed in the conveying portion.

10. An image forming apparatus comprising:
the conveying portion that conveys the sheet;
the sensor unit according to claim 7 that is arranged in the conveying portion; and
a printing portion that prints an image on the sheet conveyed in the conveying portion.

11. An image forming apparatus comprising:
the conveying portion that conveys the sheet;
the sensor unit according to claim 6 that is arranged in the conveying portion; and
a printing portion that prints an image on the sheet conveyed in the conveying portion.

12. The sensor unit according to claim 1, wherein
the first angle is 2° or more but 10° or less.

13. An image forming apparatus comprising:
the conveying portion that conveys the sheet;
the sensor unit according to claim 12 that is arranged in the conveying portion; and
a printing portion that prints an image on the sheet conveyed in the conveying portion.

14. An image forming apparatus comprising:
the conveying portion that conveys the sheet;
the sensor unit according to claim 1 that is arranged in the conveying portion; and
a printing portion that prints an image on the sheet conveyed in the conveying portion.

15. The sensor unit according to claim 1, wherein
the light source unit further includes a frame that supports an upstream end edge of the facing glass, and
the facing glass is inclined upward toward an upstream side in the sheet conveying direction such that the upstream end edge is located above a lower end part of the frame.

16. The sensor unit according to claim 1, wherein
the edge detection unit detects an edge position of the sheet in the width direction based on a difference in intensity of light between a part where the light from the light source unit enters and a part where the light from the light source unit is intercepted by the sheet P.

17. A sensor Unit comprising:
an edge detection unit that is arranged in a conveying portion conveying a sheet, the edge detection unit that detects an edge of the sheet in a width direction perpendicular to a sheet conveying direction;
a light source unit that is arranged opposite the edge detection unit thereabove, the light source unit emitting light toward the edge detection unit;
a detecting portion holder that holds the edge detection unit and the light source unit; and
a unit housing that houses the detecting portion holder and the conveying roller pair,
wherein
the edge detection unit includes a contact glass that makes contact with the sheet,
the light source unit includes a facing glass that faces the contact glass,
the contact glass and the facing glass are arranged with a gap therebetween for passage of the sheet and constitute part of the conveying portion,
light emitted from the light source unit is transmitted through the facing glass to be irradiated toward the contact glass, and
one glass out of the contact glass and the facing glass is inclined downward at a first angle in such a direction as to be increasingly far from a tangent line, which passes through a nip portion between the conveying roller pair, toward a downstream side in the sheet conveying direction.

* * * * *